(12) United States Patent
Klepser et al.

(10) Patent No.: US 8,909,186 B2
(45) Date of Patent: Dec. 9, 2014

(54) RECEIVER, METHOD AND MOBILE COMMUNICATION DEVICE

(75) Inventors: Bernd-Ulrich Klepser, Starnberg (DE); Herbert Stockinger, Schliersee (DE)

(73) Assignee: Intel Mobile Communications GmbH, Neubiberg (DE)

( * ) Notice: Subject to any disclaimer, the term of this patent is extended or adjusted under 35 U.S.C. 154(b) by 4 days.

(21) Appl. No.: 13/549,634

(22) Filed: Jul. 16, 2012

(65) Prior Publication Data

US 2014/0018026 A1    Jan. 16, 2014

(51) Int. Cl.
 *H04B 15/00* (2006.01)
 *H04B 1/26* (2006.01)
 *H04B 1/16* (2006.01)

(52) U.S. Cl.
 USPC ............ 455/313; 455/318; 455/323; 455/338

(58) Field of Classification Search
 CPC ........................................................ H04B 1/26
 USPC ............. 455/132–144, 313, 323–326, 553.1, 455/318–319, 334, 338
 See application file for complete search history.

(56) References Cited

U.S. PATENT DOCUMENTS

| | | | | |
|---|---|---|---|---|
| 6,075,980 | A * | 6/2000 | Scheck | 455/324 |
| 6,671,332 | B1 * | 12/2003 | Haubrich | 375/334 |
| 7,113,760 | B1 * | 9/2006 | Petrov et al. | 455/324 |
| 7,155,184 | B2 * | 12/2006 | Kim | 455/205 |
| 8,374,568 | B2 * | 2/2013 | Seendripu et al. | 455/317 |
| 2002/0193108 | A1 * | 12/2002 | Robinett | 455/427 |
| 2007/0298750 | A1 * | 12/2007 | Masuda | 455/323 |
| 2009/0088110 | A1 | 4/2009 | Schuur et al. | |
| 2010/0167682 | A1 * | 7/2010 | Vaisanen | 455/313 |
| 2012/0270518 | A1 * | 10/2012 | Schultz et al. | 455/256 |
| 2012/0322398 | A1 * | 12/2012 | Pullela et al. | 455/302 |
| 2013/0035053 | A1 * | 2/2013 | Liao | 455/335 |
| 2013/0122847 | A1 * | 5/2013 | Seendripu et al. | 455/317 |
| 2013/0273868 | A1 * | 10/2013 | Kenington | 455/232.1 |
| 2013/0287077 | A1 * | 10/2013 | Fernando et al. | 375/222 |

* cited by examiner

*Primary Examiner* — Simon Nguyen
(74) *Attorney, Agent, or Firm* — Eschweiler & Associates, LLC

(57) ABSTRACT

A receiver includes a first amplifier and a second amplifier, a first mixer, a second mixer and a third mixer, a first baseband signal path and a second baseband signal path. A signal output of the first amplifier is coupled to a signal input of the first mixer and a signal input of the second mixer. A signal output of the second amplifier is coupled to a signal input of the third mixer. A signal output of the first mixer and a signal output of the third mixer are coupled to the first baseband signal path. A signal output of the second mixer is coupled to the second baseband signal path.

18 Claims, 8 Drawing Sheets

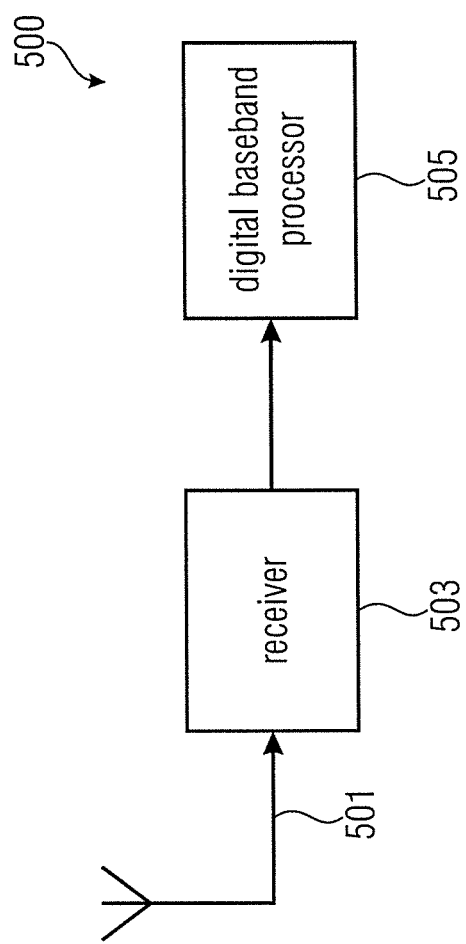

RECEIVER, METHOD AND MOBILE COMMUNICATION DEVICE

FIELD

The present invention relates to receivers and mobile communication devices. Furthermore, the present invention relates to methods for receiving an RF signal.

BACKGROUND

In a multiband receiver several LNAs are connected to a single mixer in order to save chip area. Due to the limitation of broadband RF performance of the components, the receiver is typically structured with several receive band groups, e.g. low band for the RF bands or frequencies from 700 to 1000 MHz and high band for the RF bands or frequencies from 1700 to 2700 MHz. If at a given time only one band with one carrier is active, all mixer outputs can be combined to one baseband signal path.

Some receiver architectures are capable of simultaneously receiving two carriers from a single or multiple RF bands. These receiver architectures typically have a switch to connect any LNA to any mixer, wherein the mixers are required to be broadband enough for both low band and high band operation, and two parallel baseband signal paths are required to generate two parallel baseband signals for each carrier.

Typically a switch is implemented in the RF path between the LNAs and the mixers to connect the RF signal to the appropriate baseband signal path. Nevertheless, a huge drawback of switches in the RF path is that the linearity requirements are degraded by additional elements. As a result, the current consumption increases to compensate for additional elements.

SUMMARY

The present invention relates to a receiver. The receiver comprises a first amplifier and a second amplifier. Furthermore, the receiver comprises a first mixer, a second mixer and a third mixer, a first baseband signal path and a second baseband signal path. A signal output of the first amplifier is coupled to a signal input of the first mixer and a signal input of the second mixer. A signal output of the second amplifier is coupled to a signal input of the third mixer. A signal output of the first mixer and a signal output of the third mixer are coupled to the first baseband signal path and a signal output of the second mixer is coupled to the second baseband signal path.

Furthermore, the present invention relates to a receiver comprising a first amplifier and a second amplifier, a first switch, a second switch and a third switch, a first baseband signal path and a second baseband signal path, and a controller. A signal output of the first amplifier is coupled to signal input of the first switch and a signal input of the second switch. A signal output of the second amplifier is coupled to a signal input of the third switch. A signal output of the first switch and a signal output of the third switch are coupled to the first baseband signal path. A signal output of the second switch is coupled to the second baseband signal path. The controller is configured to provide, in a first mode, to each switch an associated control signal, such that the first switch and the second switch act as mixers and the third switch electrically decouples the second amplifier from the first baseband signal path. The controller is further configured to provide, in a second mode, the control signals such that the second switch and the third switch act as mixers and the first switch electrically decouples the first amplifier from the first baseband signal path.

Furthermore, the present invention relates to a mobile communication device comprising an antenna, a digital baseband processor and a receiver. The receiver comprises a first amplifier and a second amplifier, a first mixer, a second mixer and a third mixer, and a first baseband signal path and a second baseband signal path. A signal output of the first amplifier is coupled to a signal input of the first mixer and a signal input of the second mixer. A signal output of the second amplifier is coupled to a signal input of the third mixer. A signal output of the first mixer and a signal output of the third mixer are coupled to the first baseband signal path. A signal output of the second mixer is coupled to the second baseband signal path. The receiver is coupled between the antenna and the digital baseband processor.

Furthermore, the present invention relates a method comprising receiving an RF signal comprising at least a first data carrier and a second data carrier at a first amplifier and providing a first control signal to a first mixer coupled between the first amplifier and a first baseband signal path, such that the first mixer is in a mixing mode in which the first mixer alternately electrically couples and decouples the first amplifier and the first baseband signal path for mixing the first data carrier down to the baseband. The method also comprises providing a second control signal to a second mixer coupled between the first amplifier and a second baseband signal path, such that the second mixer is in a mixing mode in which the second mixer alternately electrically couples and decouples the first amplifier and the second baseband signal path for mixing the second data carrier down to the baseband. Lastly, the method comprises providing a third control signal to a third mixer coupled between a second amplifier and the first baseband signal path, such that the third mixer is in a non-mixing mode in which the third mixer electrically decouples the second amplifier from the first baseband signal path.

BRIEF DESCRIPTION OF THE DRAWINGS

The present invention will be described in the following using the accompanying figures, in which:

FIG. 1a shows in a block schematic diagram an exemplary mobile communication device comprising an exemplary receiver;

FIG. 4b shows in a schematic another exemplary receiver comprising the exemplary implementations for the LNA, mixer CMOS filter shown in FIG. 4a.

DETAILED DESCRIPTION

In the present application a coupling between two terminals should be understood as a direct low ohmic coupling or an indirect coupling with one or more elements between, such that a signal at a second node is dependent on a signal at a first node, which is coupled to the second node. Between two coupled terminals a further element may be coupled, but not necessarily need to be, such that two terminals which are coupled to each other may be also directly connected to each other (e.g. by means of a low impedance connection, such as a wire or a wire trace).

Furthermore, according to the present application a first terminal is directly connected to a second terminal, if a signal at the second terminal is equal to a signal at the first terminal, wherein parasitic effects or minor losses due to conductor resistances shall not be regarded. In other words, two terminals which are directly connected to each other are typically connected by means of wire traces or wires without additional elements in between.

Furthermore, according to the present application, a first terminal of a transistor may be, for example, a source terminal or an emitter terminal of the transistor or a drain terminal or a collector terminal of the transistor. A second terminal may be a drain terminal or a collector terminal of the transistor or may be a source terminal or an emitter terminal of the transistor. A control terminal of the transistor may be a gate terminal or a base terminal of the transistor. Therefore, a switchable path of a transistor may be a drain source path or an emitter collector path of the transistor. A main transistor current is typically routed from the first terminal to the second terminal of the transistor or vice versa.

Furthermore two nodes or terminals are electrically coupled if a coupling path (e.g. a switchable path of a transistor) between the two coupled nodes or terminals is in a low impedance state and are electrically decoupled if the coupling path is in a high impedance state.

Figure 1B:
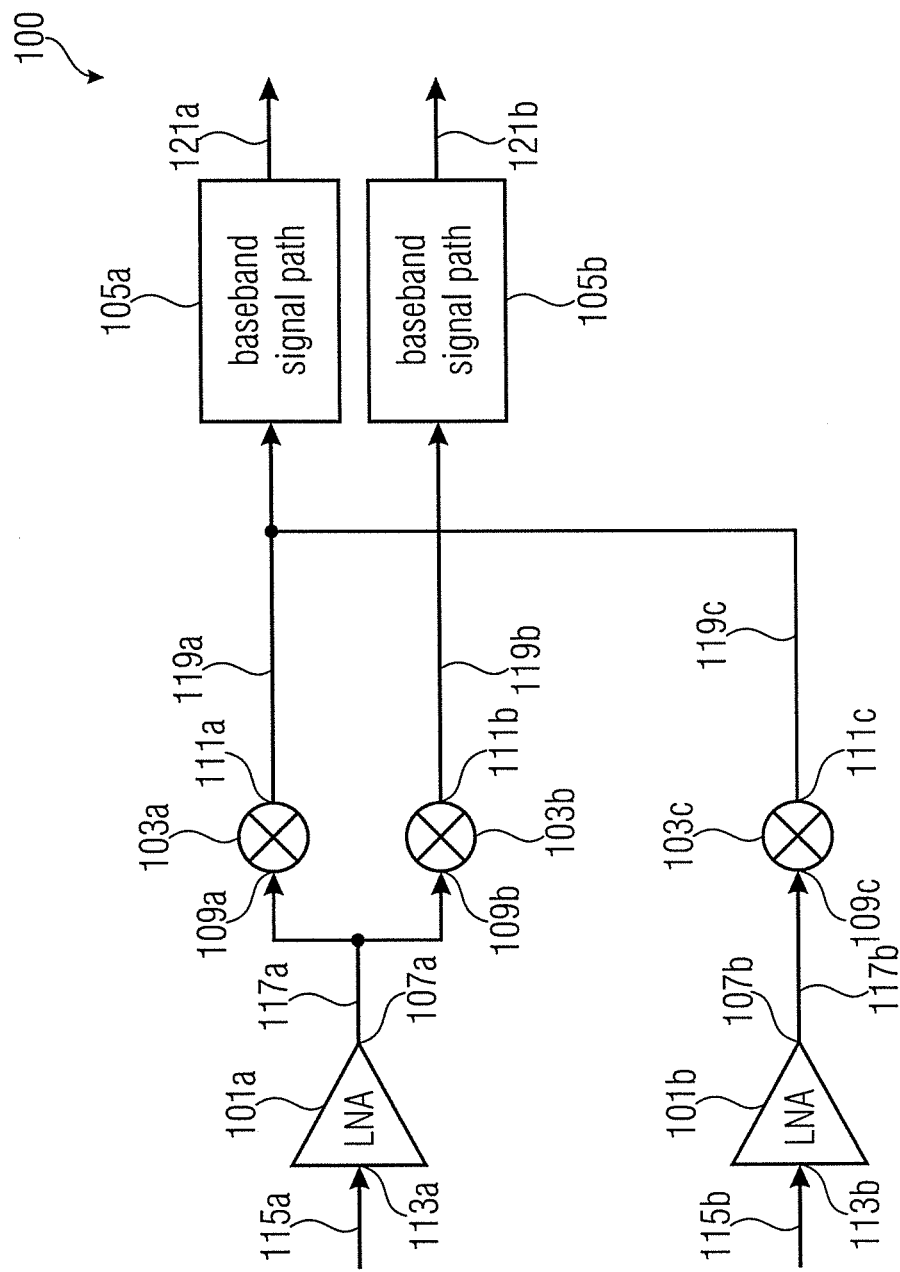
FIG. 1b shows a block schematic diagram of an exemplary receiver.

FIG. 1a shows an exemplary mobile communication device 500. The mobile communication device 500 comprises an antenna 501, a exemplary receiver 503 and a digital baseband processor 505. As an example, the receiver 503 may be one of the receivers presented in the following conjunction with the FIGS. 1b to 4b.

The antenna 501 is coupled to the receiver 503 (for example to one or more signal inputs of LNAs of the receiver 503). Furthermore, the receiver 503 is coupled to the digital baseband processor 505. For example, the receiver is configured to provide signals (for example digital baseband signals) to the digital baseband processor 505.

In other words, the receiver 503 is coupled between the antenna 501 and the digital baseband processor 505.

By having the architecture of the exemplary receiver 503 in the mobile communication device 500 the number of switches along the RF signal path can be minimized. Thus, it is an advantage that additional switches which may limit the large signal performance of the receiver 503 and therefore of the mobile communication device 500 can be eliminated or at least reduced and, hence, the overall performance of the mobile communication device 500 (in terms of linearity and power consumption) can be improved.

The mobile communication device 500 may be a portable mobile communication device.

As an example, the mobile communication device 500 can be configured to perform a voice and/or data communication (according to a mobile communication standard) with another (portable) mobile communication device and/or a mobile communication base station. Such a mobile communication device may be, for example, a mobile headset such as a mobile phone (cell phone), a so called smart phone, a tablet PC, a broadband modem, a notebook or a laptop, as well as a router, switch, repeater or a PC. Furthermore such a mobile communication device may be a mobile communication base station.

Although in FIG. 1a, the receiver 503 is presented as part of the mobile communication device 500, this receiver may be also used in other circuits or devices. In the following different examples of such receiver will be described in more detail.

Although in the following exemplary receivers the amplifier are low noise amplifiers, other amplifiers could be used also, which are not specified as low noise amplifiers. Hence the present application covers also exemplary receivers comprising amplifiers in general.

FIG. 1b shows a block schematic diagram of an exemplary receiver 100.

The receiver 100 comprises a first low noise amplifier 101a (in the following designated as LNA) and a second LNA 101b. Furthermore, the receiver 100 comprises a first mixer 103a, a second mixer 103b and a third mixer 103c. Furthermore, the receiver 100 comprises a first baseband signal path 105a and a second baseband signal path 105b. A signal output 107a of the first LNA 101a is coupled to a signal input 109a of the first mixer 103a and to a signal input 109b of the second mixer 103b. Furthermore, a signal output 107b of the second LNA 101b is coupled to a signal input 109c of the third mixer 103c. A signal output 111a of the first mixer 103a is coupled to the first baseband signal path 105a and a signal output 111b of the second mixer 103b is coupled to the second baseband signal path 105b. A signal output 111c of the third mixer 103c is coupled to the first baseband signal path 105a.

In one embodiment of the receiver 100 the switches—determining which of the LNAs 101a, 101b is connected to which of the mixers 103a, 103b, 103c—can be placed outside the RF signal path and combined with the mixing function. It has been found that the mixers 103a to 103c can be implemented such that they contain switches. These switches can be used on the one side for mixing down a data carrier in an RF signal (e.g. from the high RF frequency to the baseband) and on the other side for decoupling an LNA 101a, 101b from a corresponding baseband signal path 105a, 105b.

By having the architecture of the receiver 100 shown in FIG. 1b with the two mixers 103a, 103b coupled between the first LNA 101a and the baseband signal paths 105a, 105b and the third separate mixer 103c coupled between the second LNA 101b and the first baseband signal path 105b, the number of switches along the RF signal path (e.g. from the signal outputs 107a, 107b to the baseband signal paths 105a, 105b) can be minimized. Thus, it is an advantage that additional switches which may limit the large signal performance of the receiver 100 can be eliminated or at least reduced. The added third mixer 103c (e.g. when compared to conventional designs) does not add significant area or parasitics into the receiver 100 as it is a very small circuit (which may be implemented, as an example, using one or two single transistors). Hence, the receiver 100 enables a carrier aggregation receiver with a minimal number of switches in the RF signal path. As an example, in the case in which an RF signal is received with the first LNA 101a which comprises a first data carrier and a second data carrier, the first data carrier can be mixed down to the baseband using the first mixer 103a and the second data carrier can be mixed down to the baseband using the second mixer 103b. Furthermore, while the first LNA 101a receives the RF signal, the third mixer 103c may be in a non-mixing mode in which it electrically decouples its signal input 109c from its signal output 111c and therefore in which it electrically decouples the second LNA 101b from the first baseband signal path 105a.

As another example, a first RF signal 115a comprising just one data carrier may be received with the first LNA 101a and a second RF signal 115b comprising another data carrier may be received with the second LNA 101b. In this case, the first mixer 103a may be in a non-mixing mode in which it electrically decouples its signal input 109a from its signal output 111a, while the second mixer 103b and the third mixer 103c are in a mixing mode in which each mixer 103b, 103c mixes a data carrier comprised in RF signal applied to its signal input 109b, 109c down to the baseband. As an example, the first RF signal 115a received by the first LNA 101a may be a so-called high band RF signal (e.g. having a carrier frequency in a range from 1000 MHz to 5000 MHz or from 1700 MHz to 2700 MHz) and the second RF signal 115b received by the second LNA 101b may be a so-called low band RF signal (e.g. having a carrier frequency from 700 to 1000 MHz).

Hence, the receiver 100 can also be designated as a multi-band carrier aggregation receiver 100 which comprises a minimal number of switches in the RF signal paths.

Furthermore, the receiver 100 comprises the following additional features.

The first LNA 101a comprises a signal input 113a and the second LNA 101b comprises a signal input 113b. The first LNA 101a is configured to receive the first RF signal 115a at its signal input 113a and the second LNA 101b is configured to receive the second RF signal 115b at its signal input 113b.

The first LNA 107a is configured to amplify the first RF signal 115a to derive an amplified version 117a of the first RF signal 115a. Furthermore, the second LNA 101b is configured to amplify the second RF signal 115b to derive an amplified version 117b of the second RF signal 115b. As an example, the first LNA 101a and/or the second LNA 101b may perform a voltage to current conversion. In other words, the first RF signal 115a and/or the second RF signal 115b can be voltages or voltage signals, while the amplified version 117a of the first RF signal 115a and/or the amplified version 117b of the second RF signal 115b are currents or current signals.

Nevertheless, the receiver 100 may comprise a first additional voltage to current converter coupled between the signal output 107a of the first LNA 101a and the signal inputs 109a, 109b of the mixers 103a, 103b and a second voltage to current converter coupled between the signal output 107b of the second LNA 101b and the signal input 109c of the third mixer 103c.

Furthermore, the first mixer 103a is configured to mix a first data carrier comprised in the first RF signal 115a (and therefore also comprised in the amplified version 117a of the first RF signal 115a) down to the baseband to derive a first baseband signal 119a.

Furthermore, the second mixer 111b is configured to mix a second data carrier comprised in the first RF signal 115a (and therefore also comprised in the amplified version 117a of the first RF signal 115a) down to the baseband to derive a second baseband signal 119b. Furthermore, the third mixer 111c is configured to mix a data carrier comprised in the second RF signal 115b (and therefore also comprised in the amplified version 117b of the second RF signal 115b) down to the baseband to derive a third baseband signal 119c. The first baseband signal path 105a is configured to receive the first baseband signal 119a and the third baseband signal 119c. Furthermore, the first baseband signal path 105a is configured to process the first baseband signal 119a and the third baseband signal 119c, for example, to derive a first digital baseband signal 121a. Furthermore, the second baseband signal path 105b is configured to receive the second baseband signal 119b and process the second baseband signal 119b, for example, to derive a second digital baseband signal 121b.

The first baseband signal path 105a and the second baseband signal path 105b can perform a filtering and an analog to digital conversion of a received (analog) baseband signal to derive a digital baseband signal, which is a digital representation of the received analog baseband signal.

Figure 1C:
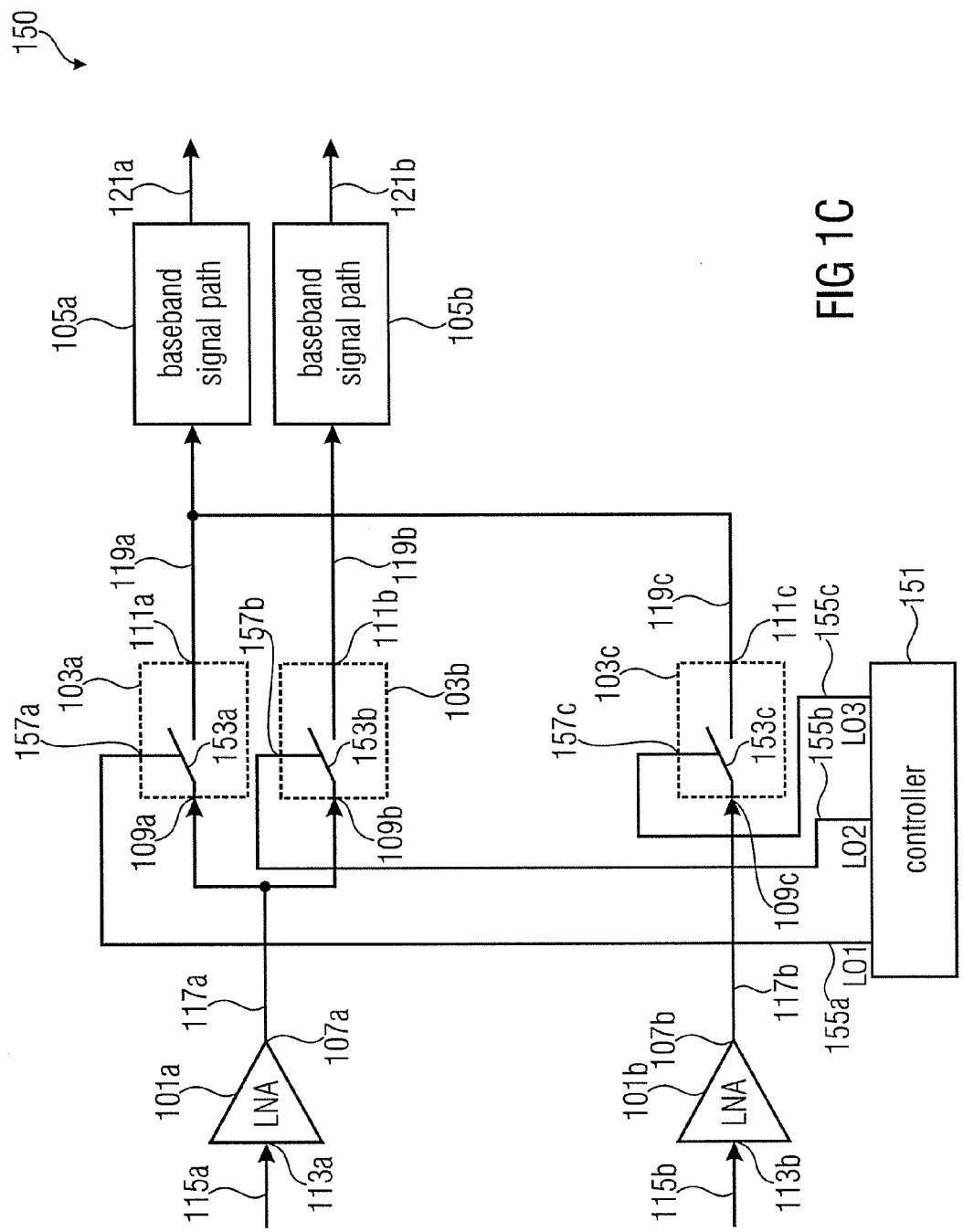
FIG. 1c shows a block schematic diagram of another exemplary receiver with exemplary implementations for the mixers.

FIG. 1c shows a block schematic diagram of an exemplary receiver 150. The receiver 150 differs from the receiver 100 shown in FIG. 1b in that a possible implementation of the mixers 103a to 103c is shown and furthermore in that it additionally comprises a controller 151. As can be seen from FIG. 1c each of the mixers 103a to 103c comprises a switchable path 153a to 153c between its signal input 109a to 109c and its signal output 111a to 111c. The switchable paths 153a to 153c are switchable between a first state and a second state. The signal input 109a to 109c and the signal output 111a to 111c of a mixer 103a to 103c are electrically coupled in the first state and are electrically decoupled in the second state. In other words, the switchable paths 153a to 153c are in their first states conducting (e.g. in a low impedance state) and in their second states non-conducting (e.g. in a high impedance state).

Hence, each of the mixers 103a to 103c is configured to switchably electrically couple and electrically decouple the LNA 101a, 101b coupled to its signal input 109a to 109c from the baseband signal path 105a, 105b coupled to its signal output 111a to 111c.

As can be seen from FIG. 1c, no further switch between the mixers 103a to 103c and the LNAs 101a to 101b is needed for decoupling a currently unused LNA 101a, 101b from its corresponding baseband signal path 105a, 105b. In other words, the signal inputs 109a, 109b of the first mixer 103a and the second mixer 103b can be directly connected to the signal output 107a of the first LNA 101a. Furthermore, the signal input 109c of the third mixer 103c is directly connected (without additional switchable paths in between) to the signal output 107b of the second LNA 101b.

In other words, no switchable paths are coupled between the signal outputs 107a, 107b of the LNAs 101a, 101b and the signal inputs 109a to 109c of the mixers 103a to 103c which are coupled to the signal outputs 107a, 107b of the LNAs 101a, 101b.

This can be achieved as each mixer 103a to 103c can be used on the one hand (in a mixing mode) as mixer for mixing down the data carriers in the amplified RF signals 117a, 117b and on the other hand (e.g. in a non-mixing mode) for electrically decoupling the LNA 101a, 101b coupled to its signal input 109a, 109b, 109c from the baseband signal path 105a, 105b coupled to its signal output 111a to 111c.

Furthermore, each of the mixers 103a to 103c is configured to switch between the first state and the second state of its switchable path 153a to 153c based on a control signal 155a to 155c applied to, control input 157a to 157c of the mixer 103a to 103c.

As can be seen from FIG. 1c, the controller 151 is configured to provide a first control signal 155a (also designated as LO1) to a control input 157a of the first mixer 103a, a second control signal 155b (also designated as LO2) to a control input 157b of the second mixer 103b and a third control signal 155c (also designated as LO3) to a control input 157c of the third mixer 103c. Furthermore, the controller 151 is configured to provide the control signals 155a to 155c such that at maximum the signal output 107a, 107b of one LNA 101a, 101b of the LNAs 101a, 101b is electrically coupled to each of the first baseband signal path 105a and the second baseband signal path 105b. In other words, in a use mode of the receiver 150 the controller 151 provides the control signals 155a to 155c such that in every mode of the receiver 100 to each baseband signal path 105a, 105b always at maximum one LNA 101a, 101b of the LNAs 101a, 101b of the receiver 150 is electrically coupled, while the other LNA or the other LNAs of the receiver 150 is or are electrically decoupled from the respective baseband signal path 105a, 105b (e.g. by means of the mixers 103a to 103c).

As an example, if in a first mode of the receiver 150 the first RF signal 115a is to be received with the LNA 101a and the first RF signal 115a comprises two different data carriers (e.g. at different carrier frequencies), the controller 151 provides the first control signal 155a such that the first mixer 103a mixes a first data carrier down to the baseband to derive the first baseband signal 119a. Furthermore, the controller 151 provides the second control signal 155b such that the second mixer 103b mixes a second data carrier down to the baseband to derive the second baseband signal 119b. Furthermore, the controller 151 provides the third control signal 155c such that the switchable path 153c of the third mixer 103c is in the second state (in which it electrically decouples the signal input 109c and the signal output 111c of the third mixer 103c from each other). Hence, in the first mode the signal output 107a is (at least for half of a period of the first control signal 155a constantly) electrically coupled to the first baseband signal path 105a by means of the first mixer 103a and is (at least for half of a period of the second control signal 155b constantly) electrically coupled to the second baseband signal path 105b by means of the second mixer 103b, while the signal output 107b of the second LNA 101b stays constantly electrically decoupled from the first baseband signal path 105a.

In other words, the controller 151 is configured to provide in the first mode, the control signals 155a to 155c such that only mixers 103a to 103b (e.g. the first mixer 103a and the second mixer 103b) are in the mixing mode in which they alternately switch between the first state and the second state of their switchable path which have their signal inputs coupled to the signal output of the same LNA (e.g. the first LNA 101a). In contrast to this, mixers (e.g. the third mixer 103c) which have their signal inputs coupled to a different LNA (e.g. the second LNA 101b) are in the non-mixing mode in which their switchable path is (or stays) in the second state.

Furthermore, as another example, in a second mode of the receiver 150 the receiver 150 is configured to receive the first RF signal 115a comprising a single first data carrier with the first LNA 101a and the second RF signal 115b comprising a second single data carrier with the second LNA 101b. In this mode the controller 151 provides the first control signal 155a such that the switchable path 153a of the first mixer 103a is or stays in its second state. Furthermore, the controller 151 provides the second control signal 155b such that the first data carrier comprised in the first RF signal 115a is mixed down by the second mixer 103b to derive the second baseband signal 119b. Furthermore, the controller 151 provides the third control signal 155c such that the second data carrier comprised in the second RF signal 115b is mixed down to the baseband by the third mixer 103c to derive the third baseband signal 119c. The third baseband signal 119c is then processed by the first baseband signal path 105a and the second baseband signal 119b is processed by the second baseband signal path 105b. Again, it can be seen that to each baseband signal path 105a, 105b at maximum one LNA 101a, 101b is electrically coupled at the same time.

Hence, the controller 151 is configured to provide in the second mode the control signals 155a to 155c such that at maximum one mixer (in the example the second mixer 103b) of the first mixer 103a and the second mixer 103b is in a mixing mode in which the one mixer 103b alternately switches between the first state and the second state of the one mixer's 103b switchable path 153b, while the other mixer (in this case the first mixer 103a) of the first mixer 103a and the second mixer 103b is in a non-mixing mode in which the other mixer's 103a switchable path 153a is in the second state (in which the other mixer 103a constantly electrically decouples the first LNA 101a coupled to its signal input 109a from the first baseband signal path 105a coupled to its signal output 111a). Furthermore, the controller 151 is configured to provide in the second mode the third control signal 155c to the third mixer 103c such that the third mixer 103c is also in the mixing mode in which its switchable path 153c alternately switches between its first state and its second state. To put a certain mixer of the mixers 103a to 103c in the mixing mode the controller 151 is configured to provide the corresponding control signal 115a to 115c as an oscillator signal (e.g. an AC signal) having a predetermined oscillator frequency. As an example, for mixing down a data carrier with a mixer of the mixers 103a to 103c the controller 151 provides the corresponding control signal 155a to 155c to the respective mixer, such that the corresponding control signal 155a to 155c has an oscillator frequency which is equal to the carrier frequency of the data carrier, such that the data carrier is mixed down to the baseband by the respective mixer.

In other words, the controller 151 provides, for placing a mixer 103a to 103c in the mixing mode, its corresponding control signal 155a to 155c as an oscillator signal having an oscillator frequency which is equal to the carrier frequency of the data carrier which is to be mixed down to the baseband with the mixer.

To summarize, the controller 151 is configured to provide, for placing a mixer of the mixers 103a to 103c in a mixing mode, its associated control signal 155a to 155c such that the control signal is an oscillator signal having a predetermined oscillator frequency and provide for placing the mixer in a non-mixing mode, the associated control signal 155a to 155c such that the control signal is a DC signal (e.g. a non-oscillating signal) having a predetermined potential.

Furthermore, the mixers 103a to 103b are configured to switch between the first state and the second state of its switchable path based on a potential of the control signals 155a to 155c applied to their control inputs 157a to 157c. Hence, the predetermined potential applied by the controller 151 to a control input 157a to 157c of a mixer 103a to 103c for placing the mixer in the non-mixing mode is chosen such that the switchable path 153a to 153c of the mixer 103a to 103c is in the second state (or enters the second state and remains in the second state).

The controller 151 can be configured to provide, for bringing a mixer in the mixing mode, the oscillator signal as a digital signal, which alternates between a first digital state and a second digital state. As an example, in the first digital state the oscillator signal may have the predetermined potential (e.g. a low potential or a high potential depending on the implementation of the switchable paths 153a to 153c) and in the second digital state the oscillator signal may have a further predetermined potential (e.g. a high potential or a low potential, depending on the implementation of the switchable paths 153a to 153c). The further predetermined potential is chosen such that for this further predetermined potential, when it is applied to a control input 157a to 157c of a mixer 103a to 103c, the corresponding switchable path 153a to 153c of the mixer 103a to 103c is in the first state. Furthermore, the controller 151 is configured to provide in the first mode of the receiver 150 described above the first control signal 155a having a first oscillator frequency (corresponding to the carrier frequency of the first data carrier in the first RF signal 115a) and the second control signal 155b having a second oscillator frequency (corresponding to the second data carrier in the first RF signal 115a). The first oscillator frequency and the second oscillator frequency can be different from each other, as also the carrier frequencies of the data carriers in the first RF signal 115a may differ from each other.

Furthermore, in the second mode of the receiver 150 described above the controller 151 is configured to provide the second control signal 155b having a third oscillator frequency (corresponding to the carrier frequency of the single first data carrier in the first RF signal 115a) and to provide the third control signal 155c having a fourth oscillator frequency (corresponding to the carrier frequency of the single second data carrier in the second RF signal 115b). Again, the third oscillator frequency and the fourth oscillator may differ from each other, as also the carrier frequencies of the data carrier in the first RF signal 115a and the second RF signal 115b may differ from each other. Just as an example, the first RF signal 115a may be a high band signal (e.g. the single first data carrier may have a carrier frequency between 1700 MHz and 2700 MHz) and the second RF signal 115b may be a low band RF signal (e.g. the single second data carrier may have a carrier frequency which is between 700 MHz and 1000 MHz).

As can be seen, the receiver 150 can be a multiband receiver 150 which is configured to simultaneously receive the first RF signal 115a in a first frequency band (such as the high frequency band) at the signal input 113a of the first LNA 101a and the second RF signal 115b in a second frequency band (such as the low frequency band) at the signal input 113b of the second LNA 101b. The possibility of receiving RF signals in the high frequency band using the first LNA 101a and RF signals in the low frequency band using the second LNA 101b enables the optimization of the first LNA 101a for the high frequency band and the optimization of the second LNA 101b for the low frequency band. In other words, the first LNA 101a can be a high frequency band LNA and the second LNA 101b can be a low frequency band LNA. Furthermore, the first mixer 103a and the second mixer 103b may be optimized for the high frequency band and the third mixer 103c may be optimized for the low frequency band. Hence, the mixers 103a to 103c do not need to be as broadband as in conventional receivers in which one mixer is used for all frequency bands (such as low frequency bands and high frequency bands).

Furthermore, the multiband receiver 150 is also a carrier aggregation receiver 150. In more detail, the receiver 150 is configured to perform an intra-band carrier aggregation using the first mixer 103a and the second mixer 103b in the mixing mode and the third mixer 103c in the non-mixing mode and to perform an inter-band carrier aggregation using the first mixer 103a in the non-mixing mode and the second mixer 103b and the third mixer 103c in the mixing mode.

To summarize, FIG. 1c shows the receiver 150, comprising the first LNA 101a and the second LNA 101b. Furthermore, the receiver 150 comprises the first mixer 103a (implemented as a first switch 103a), the second mixer 103b (implemented as a second switch 103b) and the third mixer 103c (implemented as a third switch 103c). Furthermore, the receiver 150 comprises the first baseband signal path 105a and the second baseband signal path 105b and the controller 151. The controller 151 is configured to provide in the first mode (e.g. an intra-band carrier aggregation mode in which the first RF signal 115a is to be received comprising two different data carriers) to each switch 103a to 103c the associated control signal 155a to 155c such that the first switch 103a acts as mixer, the second switch 103b acts as mixer and the third switch 103c electrically decouples the second LNA 101b from the first baseband signal path 105a. Furthermore, the controller 151 is configured to provide in the second mode (e.g. a multiband receive mode or an inter-band carrier aggregation receive mode, in which each of the RF signals 115a, 115b comprises a single data carrier) the control signals 155a to 155c such that the second switch 103b and the third switch 103c act as mixers and the first switch electrically decouples the first LNA 101a from the first baseband signal path 105a.

Figure 4A:
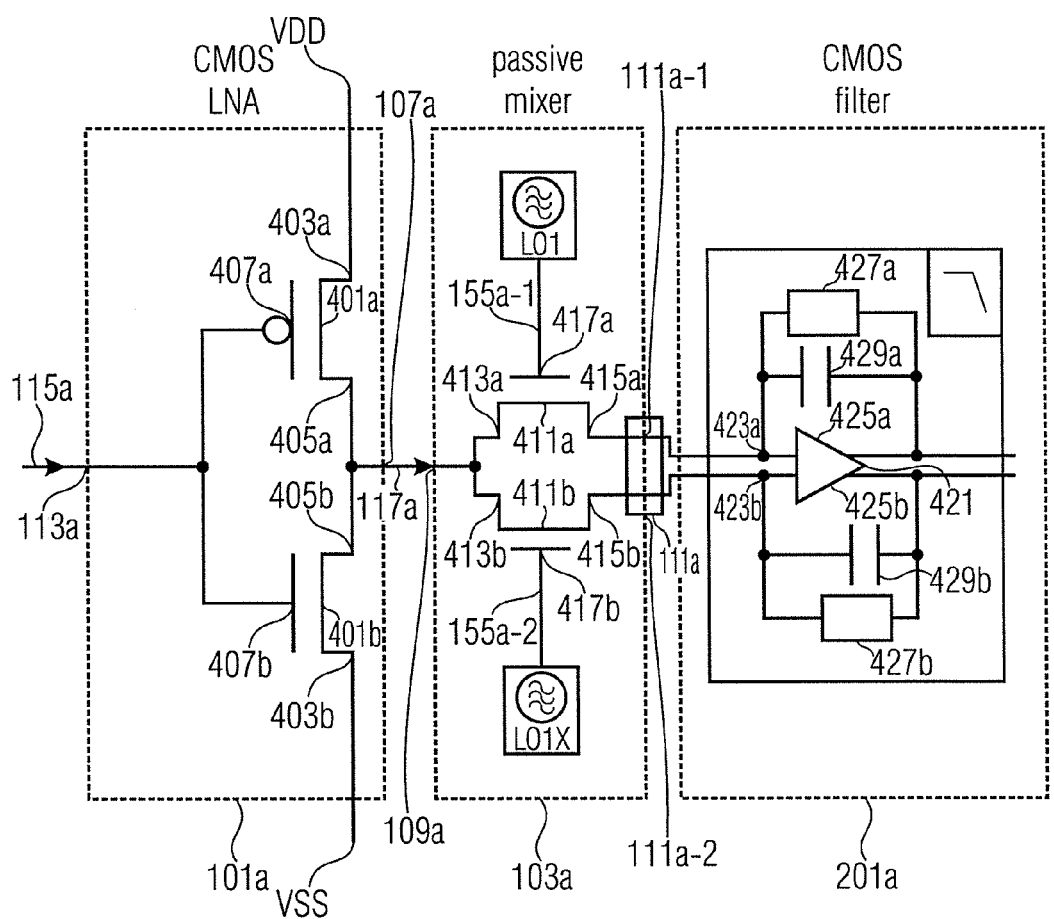
FIG. 4a shows in a schematic exemplary implementations of an LNA, a mixer and a CMOS filter.
Figure 4A:
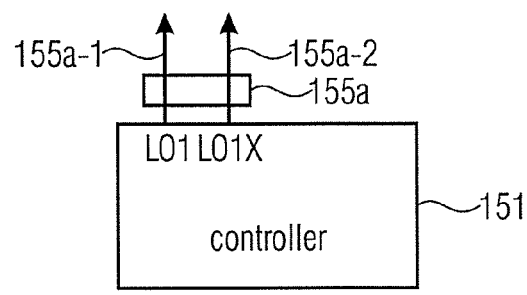
Figure 4B:
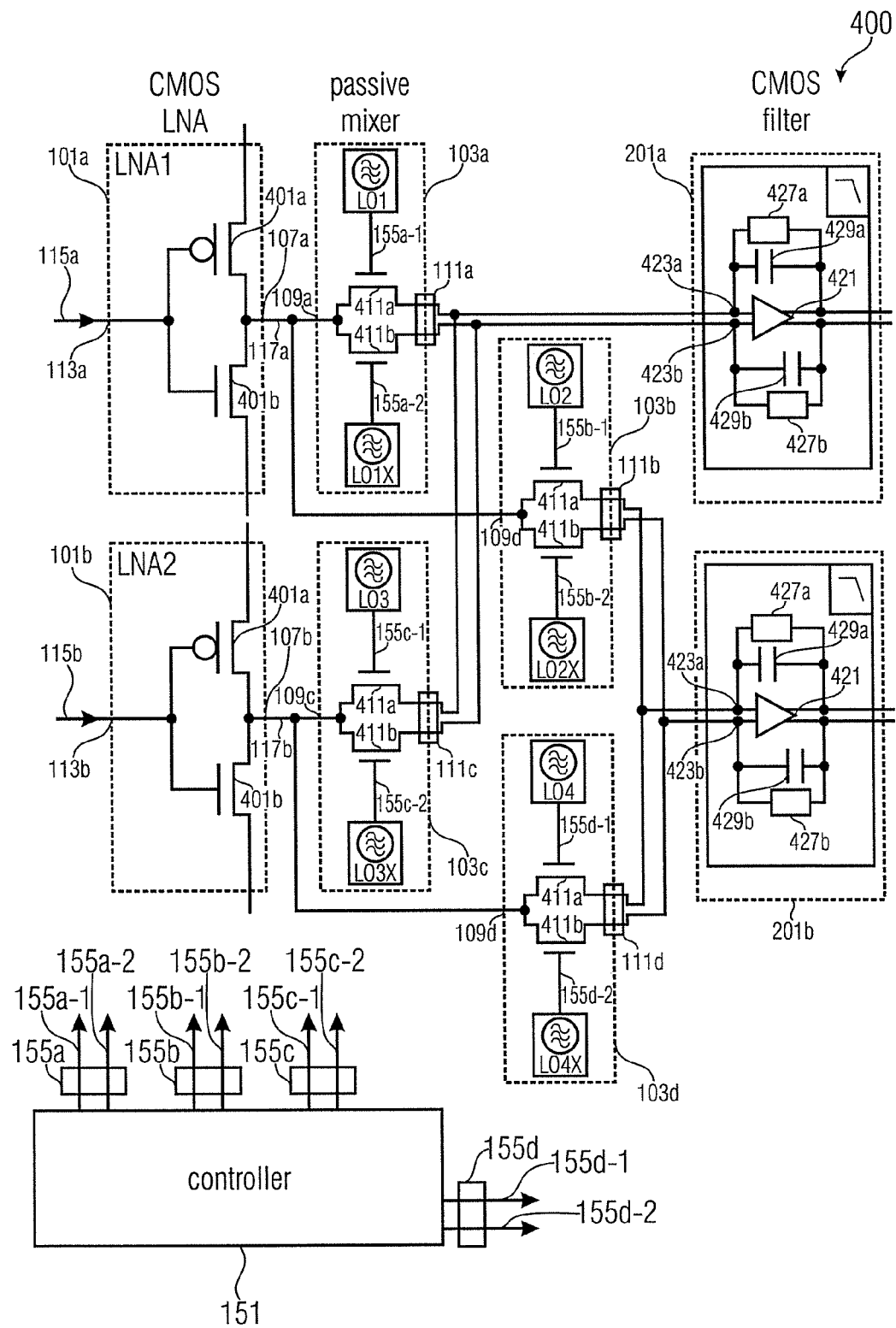

Possible implementations (using transistors) of the LNAs 101a and 101b and the mixers 103a to 103c will be shown in more detail using the FIGS. 4a and 4b.

Furthermore, the receiver 100 and the receiver 150 shown in FIGS. 1a and 1b may be extended to a plurality of frequency bands.

Figure 2:
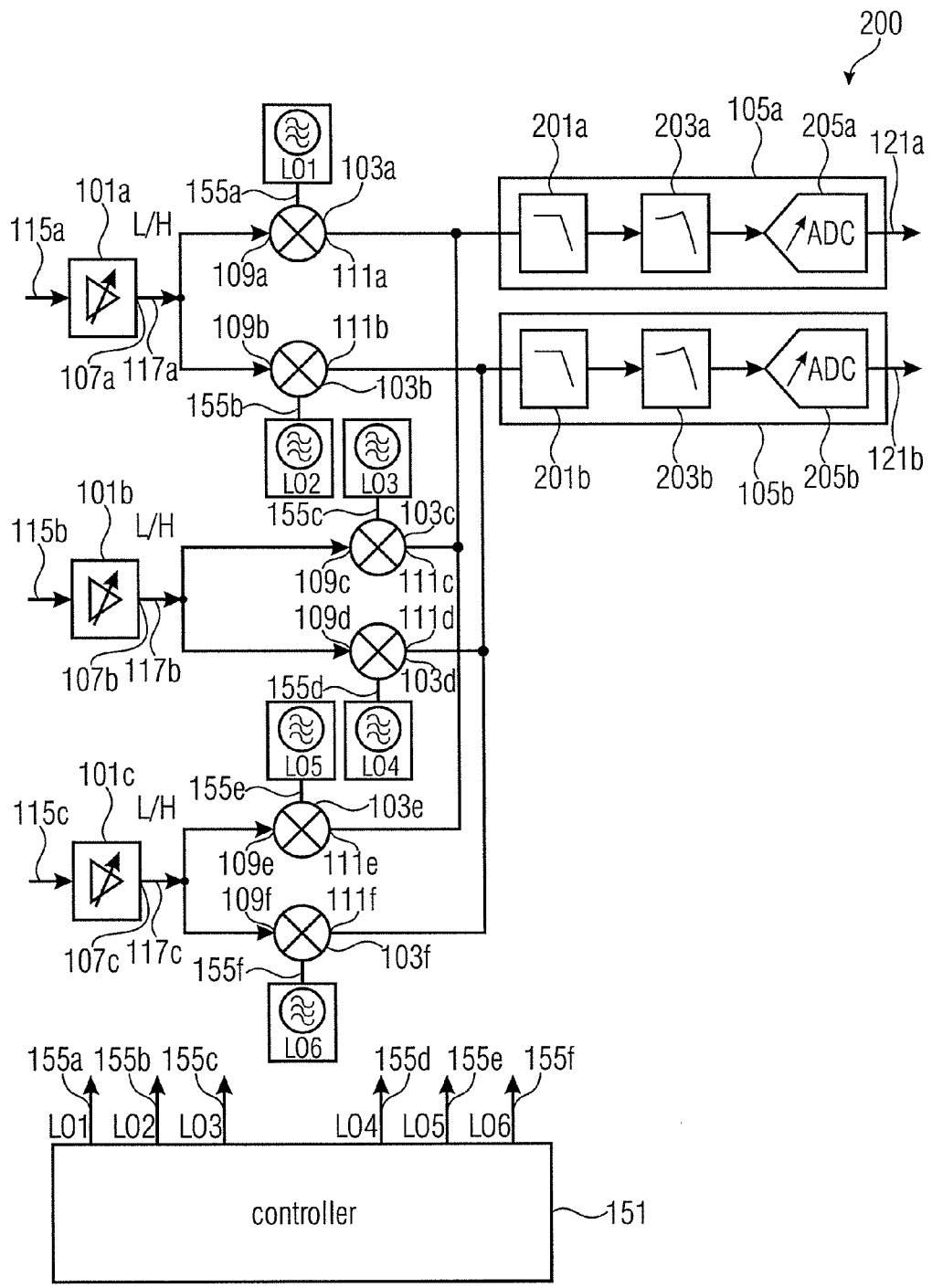
FIG. 2 shows a block schematic diagram of another exemplary receiver for receiving three RF signals.

As an example, FIG. 2 shows a block schematic diagram of another exemplary receiver 200. The receiver 200 extends the receiver 100 shown in FIG. 1b by a third LNA 101c, a fourth mixer 103d, a fifth mixer 103e and a sixth mixer 103f. The signal output 107b of the second LNA 101b is furthermore coupled to a signal input 109d of the fourth mixer 103d, a signal output 111d of the fourth mixer 103d is coupled to the second baseband signal path 105b. Furthermore, a signal output 107c of the third LNA 101c is coupled to a signal input 109e of the fifth mixer 103e and to a signal input 109f of the sixth mixer 103f. A signal output 111e of the fifth mixer 103e is coupled to the first baseband signal path 105a and a signal output 111f of the sixth mixer 103f is coupled to the second baseband signal path 105b. The third LNA 101c is configured to receive a third RF signal 115c.

Furthermore, the controller 151 is configured to provide a fourth control signal 155d to the fourth mixer 103d, a fifth control signal 155e to the fifth mixer 103e and a sixth control signal 155f to the sixth mixer 103f.

The description provided for the receivers 100, 150 shown in FIGS. 1a and 1b also applies to the receiver 200 shown in FIG. 2. A difference is that the receiver 200 comprises the additional third LNA 101c and the additional mixers 103d to 103f. Nevertheless, the controller 151 is configured to provide, as already described, the control signals 155a to 155f such that during a use mode of the receiver 200 (always) at maximum one LNA 101a to 101c is electrically coupled to each baseband signal path 105a, 105b, while the other LNAs 101a to 101c are (constantly) electrically decoupled from this baseband signal path 105a to 105b.

Furthermore, in FIG. 2 a possible implementation of the baseband signal path 105a, 105b is shown.

Each of the baseband signal paths 105a, 105b comprises a first filter 201a, 201b. The first filter 201a of the first signal path 105a is coupled to the signal outputs 111a, 111c, 111e of the first mixer 103a, the third mixer 103c and the fifth mixer 103e. The first filter 201b of the second baseband signal path 105b is coupled to the signal outputs 111b, 111d, 111f of the second mixer 103b, the fourth mixer 103d and the sixth mixer 103f. As an example, the first filters 201a, 201b may be implemented as an Op-Amp based filter which sinks the RF current to the mixer. Furthermore, each of the baseband signal paths 105a, 105b comprises a second filter 203a, 203b, a signal input of which is coupled to a signal output of the respective first filter 201a, 201b of the corresponding baseband signal path 105a, 105b. Furthermore, each of the baseband signal paths 105a, 105b comprises an analog to digital converter 205a to 205b which is coupled to a signal output of the respective second filter 203a, 203b of the corresponding baseband signal path 105a, 105b. The analog to digital converter 205a of the first baseband signal path 105a is configured to provide the first digital baseband signal 121a. The analog to digital converter 205b of the second baseband signal path 105b is configured to provide the second digital baseband signal 121b.

The exemplary receiver 200 can have the switches—determining which LNA 101a to 101c is connected to which mixer 103a to 103f—outside the RF signal path and combined with a mixing function (which contains switches anyway, as shown in FIG. 1c).

In other words, FIG. 2 shows a low power RX architecture comprising the LNA stages 101a to 101c (which may be CMOS stages), which are also acting as a voltage to current converter, followed by the passive mixers 103a to 103f (which may comprise LO driven switches). The passive mixers 103a to 103f operate in a current domain as a current to current switch. The mixers 103a to 103f are followed by a first pole of the mixer implemented as the Op-Amp based filters 201a, 201b which sink the RF current of the mixers 103a to 103f. It is a basic idea to use the switches (or in other words the mixers 103a to 1030 used for RF demodulation also to switch the signal to the desired baseband signal path 105a, 105b and thereby to the desired channel.

Hence, examples described herein enable an implementation without any additional devices in the RF signal path compared to an implementation without carrier aggregation.

Thus, it is an advantage of the proposed switching architecture that it eliminates additional switches which may limit the large signal performance of the receiver. As a consequence, more circuitry may be implemented in the mixers, however, these circuits are very small and do not add significant area or parasitics into the receiver.

To summarize, FIG. 2 shows a possible implementation of a receiver 200 in which in a single carrier mode typically the LO2, LO4, LO6 mixers 103b, 103d, 103f are switched off, and in a dual carrier mode (in an intra-band carrier aggregation mode) at least one of the LO2, LO4, LO6 switches 103b, 103d, 103f is switched on. In case of a voltage interface between the LNAs 101a to 101c and the mixers 103a to 103f the circuitry will result in a similar performance in both modes (in the above described first mode and the second mode). However, for a current interface between the LNAs 101a to 101c and the mixers 103a to 103f the performance will be similar to the implementation of a receiver 300 described in the following in conjunction with FIG. 3, since in the single carrier mode all signal current of one LNA 101a to 101c will flow into the same baseband signal path (e.g. in the first baseband signal path 105a or in the second signal path 105b), and in a dual carrier mode (intra-band carrier aggregation mode), the current is split between the two mixers 103a, 103b or 103c, 103d or 103e, 103f coupled to the respective LNA 101a to 101c.

As can be seen from FIG. 2, a number of LNAs and mixers may be chosen arbitrarily, based on the number of RF signals (or based on the number of different frequency bands) to be received. Furthermore, the number of baseband signal paths may be chosen arbitrarily, for example based on the number of digital baseband signals to be received simultaneously.

Figure 3:
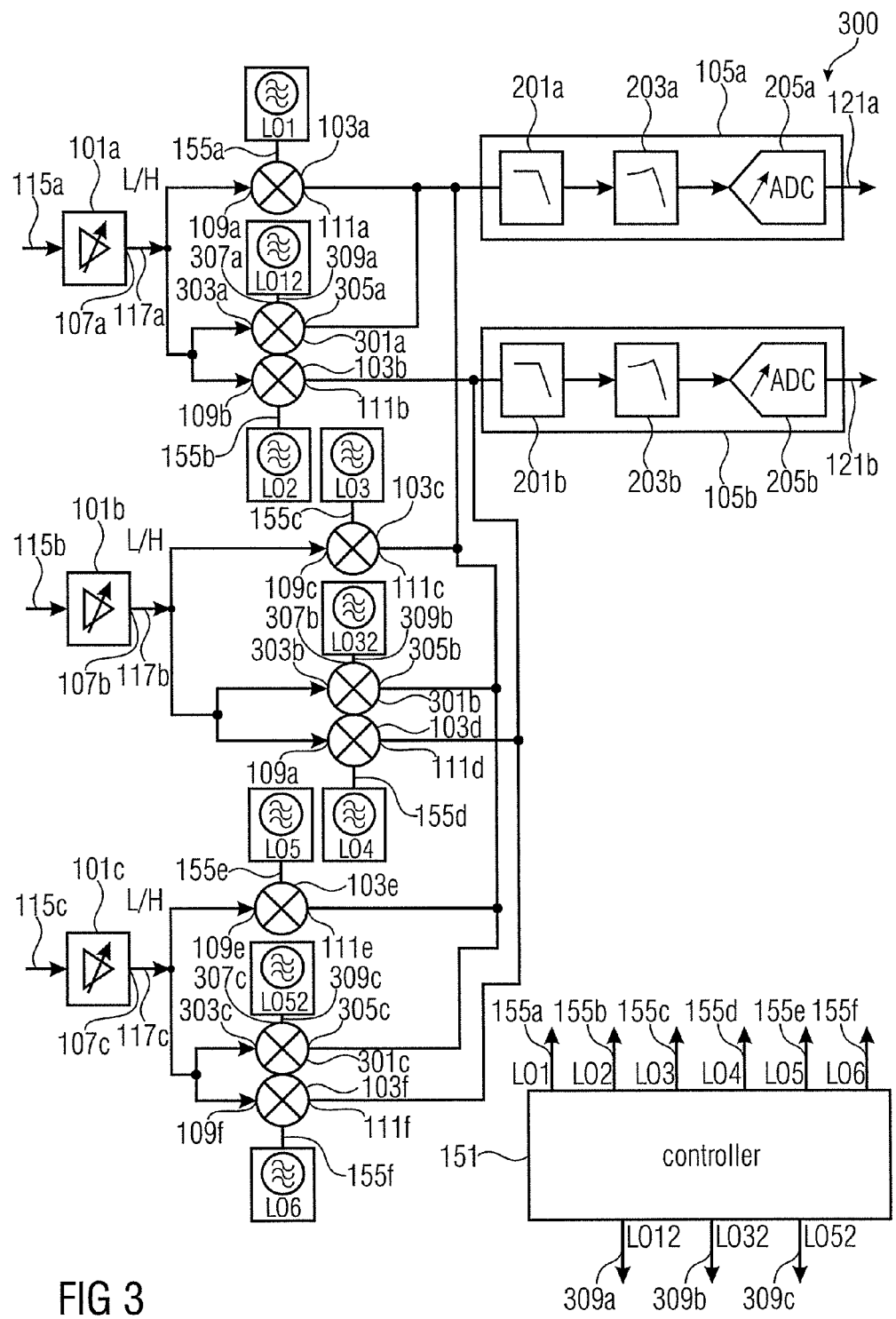
FIG. 3 shows a block schematic diagram of a another exemplary receiver having additional mixers when compared to the receiver shown in FIG. 2.

FIG. 3 shows another exemplary receiver 300.

The receiver 300 shown in FIG. 3 differs from the receiver 200 shown in FIG. 2 in that for each LNA 101a to 101c an additional mixer 301a to 301c is provided.

In other words, per LNA 101a to 101c of the receiver 300 not just two mixers are provided, but three mixers.

As can be seen from FIG. 3 a signal input 303a of a first additional mixer 301a is coupled to the signal output 107a of the first LNA 101a and a signal output 305a of the first additional mixer 301a is coupled to the signal output 111a of the first mixer 103a and therefore to the first baseband signal path 105a. A signal input 303b of a second additional mixer 301b is coupled to the signal output 107b of the second LNA 101b and a signal output 305b of the second additional mixer 301b is coupled to the signal output 111c of the third mixer 301c and therefore to the first baseband signal path 105a. A signal input 303c of a third additional mixer 301c is coupled to the signal output 107c of the third LNA 101c and a signal output 305c of the third additional mixer 301c is coupled to the signal output 111e of the fifth mixer 103e and therefore to the first baseband signal path 105a.

The controller 151 is configured to provide a first additional control signal 309a (also designated as LO12) to a control input 307a of the first additional mixer 301a, a second additional control signal 309b (also designated as LO32) to a control input 307b of the second additional mixer 301b and a third additional control signal 309c (also designated as LO52) to a control input 307c of the third additional mixer 301c.

To summarize, each of the LNAs 101a to 101c comprises two mixers 103a, 301a, 103c, 301b, 103e, 301c, which are coupled in parallel between the signal output 107a to 107c of the LNA 101a to 101c and one of the baseband signal paths 105a, 105b. In the example shown in FIG. 3 the additional mixers 301a to 301a are all coupled to the first baseband signal path 105a, but nevertheless one or some of the additional mixers may be coupled to the second baseband signal path 105b.

The advantage of using three mixers per LNA is that the highest performance is obtained in the mostly used single carrier mode (in the above described second mode, in which one LNA 101a to 101c is coupled at maximum to one of the baseband signal paths 105a, 105b), since both LNA outputs of one LNA 101a to 101c are combined after the corresponding mixers 103a, 301a or 103c, 301b or 103e, 301c in to one single baseband signal path (in the case shown in FIG. 3 into the first baseband signal path 105a).

Furthermore, the controller 151 is configured to provide in the second mode of the receiver 300 the first control signal 155a and the first additional control signal 309a such that they are equal, the third control signal 155c and the second additional control signal 309b such that they are equal and the fifth control signal 155e and the third additional control signal 309c such that they are equal.

When switching to the dual carrier mode (the first mode of the receiver 300 in which two data carriers are to be received in one of the RF signals 115a to 115c) the additional control signals 309a to 309c are provided by the controller 151 such that the corresponding additional mixers 301a to 301c enter the non-mixing mode in which their signal inputs 303a, 303c and their signal outputs 305a to 305c are constantly electrically decoupled from each other.

As an example, assuming the receiver 300 is in the second mode in which the first RF signal 115a is to be received having a single data carrier. In this case the controller 151 provides the first control signal 155a and the first additional control signal 307a such that they are equal and such that the first mixer 103a and the first additional mixer 301a are in the mixing mode. Hence the single data carrier is mixed down to the baseband by both the first mixer 103a and the first additional mixer 301a. Resulting output signals provided at the signal outputs 111a, 305a of the first mixer 103a and the first additional mixer 301a are combined and fed into the first baseband signal path 105a. The first controller 151 provides the second control signal 155b such that the second mixer 103b is in the non-mixing mode. Furthermore, if no further RF signal is to be received (using the second baseband signal path 105b and one of the LNAs 101b, 101c), the controller 151 provides the remaining control signals 155c to 155f, 309b, 309b, such that the remaining mixers 103c to 103f, 301b, 301c are in the non-mixing mode.

When switching to the dual carrier mode (for example to the first mode of the receiver 300) in which the first RF signal 115a is to be received comprising two different data carriers, the controller 151 provides the first control signal 155a such that the first mixer 103a is in the mixing mode and the second control signal 155b such that the second mixer 103b is in the mixing mode. Furthermore, the controller 151 provides in this case the first additional control signal 309a such that the first additional mixer 301a is in the non-mixing mode. Furthermore, the controller 151 provides the remaining control signals 155c to 155f, 309b, 309b, such that the remaining mixers 103c to 103f, 301b, 301c are in the non-mixing mode.

In other words, when switching to the dual carrier mode, the LO12 at the lower LNA output of the first LNA 101a is switched off and the LO2 at the lower LNA output of the first LNA 101 is switched on. Since both mixers (the first additional mixer 301a and the second mixer 103b) can be identical, the switching will not disturb the input impedance of the first LNA 101a. However, the signal current into the baseband signal path 105a of LO1 is reduced by 50%. To summarize, the implementation of an additional mixer 301a, 301b, 301c may be equal to an implementation of the mixer 103a to 103f coupled to the same LNA 101a to 101c as the additional mixer 301a to 301c. Hence, it can be achieved that when switching from a single carrier mode to a dual carrier mode the input impedance of the LNAs 101a to 101c is not disturbed.

To summarize, the receiver 300 is configured to provide in the second mode of the receiver 300 (and when the first RF signal 115a is to be received) the first control signal 155a and the first additional control signal 309a such that they are equal and the data carrier in the first RF signal 115a is mixed down to the baseband simultaneously by the first mixer 103a and the first additional mixer 301. Furthermore, the controller provides the second control signal 155b such that the second mixer 103b is in the non-mixing mode.

Furthermore, in the case in which the receiver 300 is in the first mode and the first RF signal 115a is to be received comprising the two different data carriers the controller 151 provides the first control signal 155a and the first additional control signal 309a such that the first data carrier in the received RF signal 115a is mixed down to the baseband either by the first mixer 103a or by the first additional mixer 301a, while the other mixer of the first mixer 103a and the first additional mixer 301a is in the non-mixing mode. Furthermore, in this case the controller provides the second control signal 155b such that the second data carrier in the received first RF signal 115a is mixed down to the baseband by the second mixer 103b.

FIG. 4a shows a circuit diagram of possible implementations of the LNAs, mixers and filters which can be used in exemplary receivers.

In detail FIG. 4a shows a possible implementation for the first LNA 101a, the first mixer 103a and the first filter 201a of the first baseband signal path 105a. Of course, the circuit diagrams shown in FIG. 4a are also applicable to the further LNAs, the further mixers and the first filter 201b of the second baseband signal path 105b used in the receivers described herein.

The circuit diagram shown in FIG. 4a is optimized for minimum devices in the signal path and best usage of CMOS circuitry with no DC current between stages. The usage of as few devices as possible results in the best linearity to DC current consumption ratio. Using the circuits shown in FIG. 4a the carrier aggregation functionality can be easily implemented as will be also shown in conjunction with FIG. 4b. As can be seen in FIG. 4a the first LNA 101a comprises a first transistor 401a from a first transistor type and a second transistor 401b from a second transistor type. In the example shown in FIG. 4a the first transistor type is pMOS and the second transistor type is nMOS. The first terminal 403a of the first transistor 401a of the first LNA 101a is coupled to a first potential terminal (e.g. a supply voltage potential terminal VDD). A second terminal 405a of the first transistor 401a is coupled to a second terminal 405b of the second transistor 401b of the first LNA 101a. Furthermore, the second terminals 405a, 405b of the transistors 401a, 401b are coupled to the signal output 107a of the first LNA 101a. A first terminal 403b of the second transistor 401b of the first LNA 101a is coupled to second potential terminal (a ground potential terminal VSS). Furthermore, a control terminal 407a of the first transistor 401a and a control terminal 407b of the second transistor 401b are coupled to the signal input 113a of the first LNA 101a. The signal input 113a can be directly connected to the gate terminals 407a, 407b of the transistors 401a, 401b and the second terminals 405a, 405b of the transistors 401a, 401b are directly connected to the signal output 107a of the first LNA 101a. To summarize, in the example shown in FIG. 4a the first LNA 101 is implemented with a simple two transistor inverter. As can be seen in FIG. 4a, the first LNA 101a also acts as a voltage to current converter, as an input signal provided to the signal input 113a is a voltage and an output signal provided by the first LNA 101a at its signal output 107a is a current.

Hence, no further gm stage is needed for converting the output signal of the first LNA 101a from a voltage to a current before it is fed to the first mixer 103a. The signal output 107a of the first LNA 101a can be directly connected to the signal input 109a of the first mixer 103a.

Furthermore, as can be seen from FIG. 4a, the first mixer 103a is implemented as a differential passive mixer. Hence, the signal output 111a of the first mixer 103a comprises a first output terminal 111a-1 and a second output terminal 111a-2. Furthermore, the first mixer 103a comprises a first transistor 411a and a second transistor 411b. In the example shown in FIG. 4a the first transistor 411a and the second transistor 411b are both from the second transistor type (e.g. nMOS). Nevertheless, a complementary implementation (e.g. using pMOS transistors) is also possible.

A first terminal 413a of the first transistor 411a and a first terminal 413b of the second transistor 411b of the first mixer 103a are both directly connected to the signal input 109a of the first mixer 103a. A second terminal 415a of the first transistor 411a is directly connected to the first output terminal 111a-1 of the first mixer 103a. A second terminal 415b of the second transistor 411b is directly connected to the second output terminal 111a-2 of the first mixer 103a.

Furthermore, a control terminal 417a of the first transistor 111a together with a control terminal 417b of the second transistor 411b form the control input 157a of the first mixer 103a. Hence, the first mixer 103a comprises the differential signal output 111a and the differential control input 157a.

Hence, the controller 151 is configured to provide to the first mixer 103a the control signal 155a as a differential control signal comprising a first control part signal 155a-1 which is provided to the control terminal 417a of the first transistor 411a of the first mixer 103a. Furthermore, the controller 151 is configured to provide a second control part signal 155a-2 to the control terminal 417b of the second transistor 411b of the first mixer 103a. The first control part signal 155a-1 and the second control part signal 155a-2 together form the differential control signal 155a. Furthermore, a frequency of the first control part signal 155a-1 and a frequency of the second control part signal 155a-2 are equal but the first control part signal 155a-1 and the second control part signal 155a-2 are phase shifted by 180° with respect to each other.

Furthermore, the first filter 201a (in the following designated as CMOS filter 201a) comprises a differential operational amplifier 421 (in the following also designated as differential Op-Amp 421). The differential Op-Amp 421 comprises a differential input comprising a first input terminal 423a and a second input terminal 423b. Furthermore, the differential Op-Amp 421 comprises a differential output comprising a first output terminal 425a and a second output terminal 425b. Furthermore, the CMOS filter 201a comprises a first resistor 427a and a first capacitor 429a which are coupled in parallel between the first input terminal 423a and the first output terminal 425a of the differential Op-Amp 421. Furthermore, the CMOS filter 201a comprises a second resistor 427b and a second capacitor 429b which are coupled in parallel between the second input terminal 423b and the second output terminal 425b of the differential Op-Amp 421. Furthermore, the first input terminal 423a of the differential Op-Amp 421 is directly connected to the first output terminal 111a-1 of the first mixer 103a. The second input terminal 423b of the differential Op-Amp 421 is directly connected to the second output terminal 111a-2 of the first mixer 103a.

As can be seen from FIG. 4a, the LNAs can be implemented as CMOS LNAs, the mixers are implemented as passive mixers and the filters are implemented as CMOS filters.

Since the output of the CMOS LNA 101a acts as a current source into the passive mixer 103a, the combination of an LO switch and a carrier aggregation switch can be easily fulfilled by a single mixer transistor as shown in FIG. 4a, which demonstrates the advantage of the proposed architecture. To summarize, FIG. 4a shows a lineup of the CMOS LNA 101a, the passive mixer 103a and the Op-Amp filter 201a.

A switchable path of the mixer 103a may be, for example, a switchable path between the first terminal 413a and the second terminal 415a of the first transistor 411a. Furthermore; the mixer 103a comprises in the example shown in FIG. 4a a further switchable path between the first terminal 413b and the second terminal 415b of the second transistor 411b. The first state of the switchable path of the first mixer 103a is a state in which the first transistor 411a is conducting and the second state of the switchable path of the first mixer 103a is a state in which the first transistor 411a is non-conducting. Hence, the predetermined potential and the further predetermined potential applied with the first part control signal 155a-1 to the control terminal 417a of the first transistor 411 are chosen such that for the predetermined potential the first transistor 411a is non-conducting and for the further predetermined potential the first transistor 411a is conducting.

The same applies to the potential supplied with the second part control signal 155a-2 to the control terminal 417b of the second transistor 411b.

In a mixing mode of the mixer 103a the first transistor 411a and the second transistor 411b of the first mixer 103a are alternately conducting and non-conducting, wherein the first transistor 411a is conducting when the second transistor 411b is non-conducting and wherein the second transistor 411b is conducting when the first transistor 411a is non-conducting.

In contrast to this, in the non-mixing mode of the first transistor 103a both transistors (the first transistor 411a and the second transistor 411b) of the first mixer 103a are non-conducting.

FIG. 4b shows a schematic of a receiver 400 which differs from the receiver 200 shown in FIG. 2 in the fact that only four mixers 103a to 103d and only two LNAs 101a, 101b are shown. Furthermore, the filters 203a, 203b and the ADCs 205a, 205b of the baseband signal path 105a, 105b are not shown.

Furthermore, the LNAs 101a, 101b, the mixers 103a to 103d and the CMOS filters 201a, 201b are implemented as shown in FIG. 4a. Hence, each of the mixers 103a to 103d is a differential mixer comprising differential signal outputs 111a to 111d, as shown in FIG. 4a. Furthermore, the controller 151 is configured to provide to each of the mixers 103a to 103d a differential control signal 155a to 155d wherein each differential control signal comprises a first control part signal 155a-1 to 155d-1 and a second control part signal 155a-2 to 155d-2. Frequencies of two control part signals 155a-1 to 155d-1, 155a-2 to 155d-2 belonging to the same control signal 155a to 155d are equal. A phase of a first control part signal 155a-1 to 155d-1 is phase shifted by 180° with respect to a phase of the corresponding second control part signal 155a-2 to 155d-2.

Although the implementations shown in FIG. 4a and FIG. 4b are differential implementations, single ended implementations are also possible.

To summarize, FIG. 4b shows a exemplary receiver 400 comprising two CMOS LNAs 101a, 101b, four passive mixers 103a to 103d and two Op-Amp filters 201, 201b with carrier aggregation functionality. Hence the receiver 400 provides an architecture that switches the signal within by switches in the LO domain and/or switches at the output of the mixer, with switches outside the RF signal path.

Figure 5:
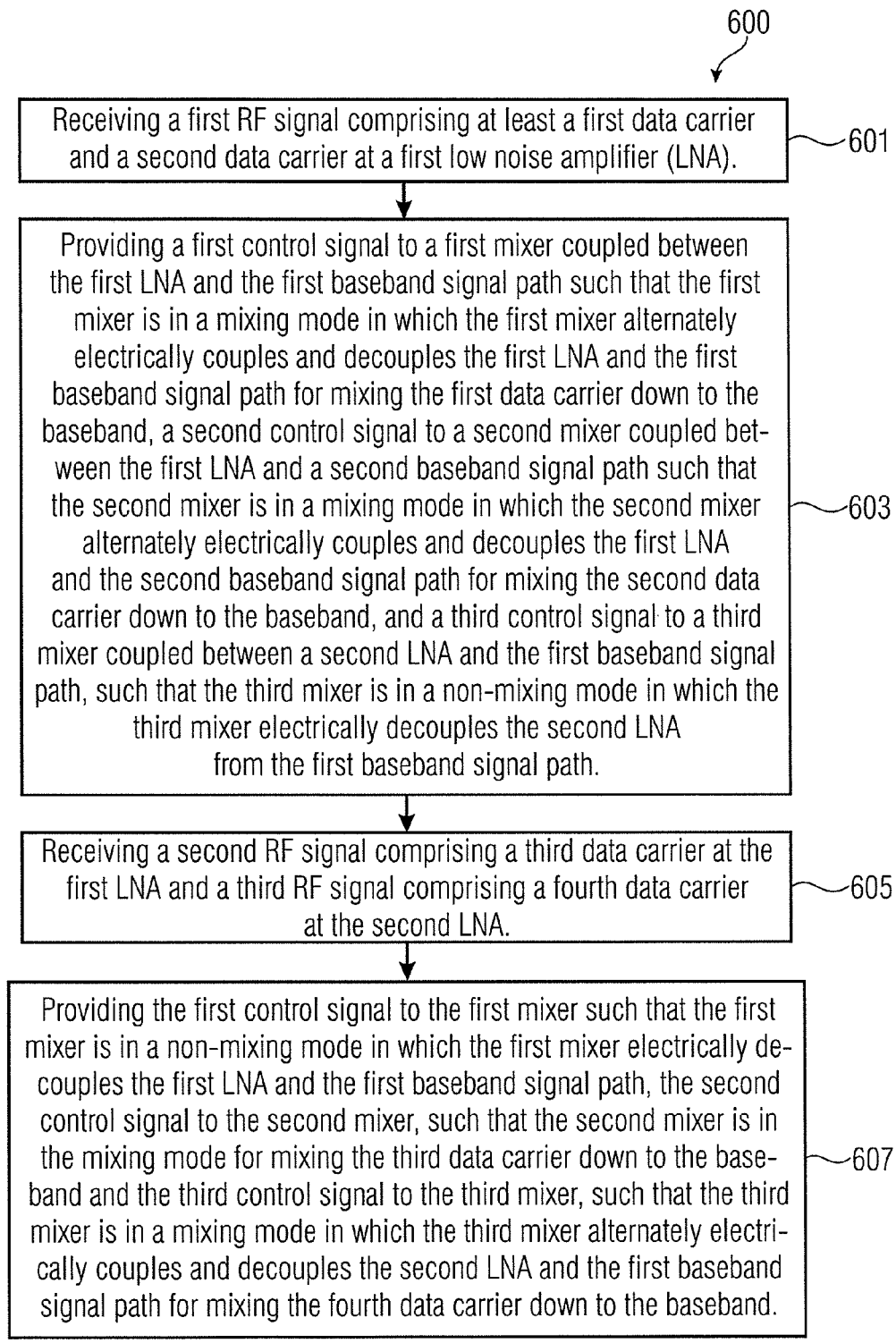
FIG. 5 shows a flow diagram of a an exemplary method for receiving an RF signal.

FIG. 5 shows a flow diagram of an exemplary method 600.

The method 600 comprises receiving a first RF signal comprising at least a first data carrier and a second data carrier at a first low noise amplifier at 601.

Furthermore, the method 600 comprises (simultaneously) providing a first control signal to a first mixer coupled between the first LNA and the first baseband signal path such that the first mixer is in a mixing mode in which the first mixer alternately electrically couples and decouples the first LNA and the first baseband signal path for mixing the first data carrier down to the baseband. The method 600 also comprises providing a second control signal to a second mixer coupled between the first LNA and a second baseband signal path such that the second mixer is in a mixing mode in which the second mixer alternately electrically couples and decouples the first LNA and the second baseband signal path for mixing the second data carrier down to the baseband. Further, the method 600 comprises providing a third control signal to a third mixer coupled between a second LNA and the first baseband signal path, such that the third mixer is in a non-mixing mode in which the third mixer electrically decouples the second LNA from the first baseband signal path at 603.

Furthermore, the method 600 additionally comprises receiving a second RF signal comprising a third data carrier at the first LNA and a third RF signal comprising a fourth data carrier at the second LNA at 605.

Furthermore, the method 600 comprises (simultaneously) providing the first control signal to the first mixer such that the first mixer is in a non-mixing mode in which the first mixer electrically decouples the first LNA and the first baseband signal path, the second control signal to the second mixer, such that the second mixer is in the mixing mode for mixing the third data carrier down to the baseband and the third control signal to the third mixer, such that the third mixer is in a mixing mode in which the third mixer alternately electrically couples and decouples the second LNA and the first baseband signal path for mixing the fourth data carrier down to the baseband at 607.

The method 600 may be performed by any exemplary receiver, such as any receiver presented herein.

The method 600 may be supplemented by any of the features and functionalities described herein with respect to the apparatus, and may be implemented using the hardware components of the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some examples, some one or more of the most important method steps may be executed by such an apparatus.

Depending on certain implementation requirements, examples can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some examples comprise a data carrier having electronically readable control signals, which are capable of cooperating with a programmable computer system, such that one of the methods described herein is performed.

Generally, examples can be implemented as a computer program product with a program code, the program code being operative for performing one of the methods when the computer program product runs on a computer. The program code may for example be stored on a machine readable carrier.

Other examples comprise the computer program for performing one of the methods described herein, stored on a machine readable carrier.

In other words, an implementation of the exemplary method is, therefore, a computer program having a program code for performing one of the methods described herein, when the computer program runs on a computer.

A further implementation of the exemplary method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further implementation of the exemplary method is, therefore, a data stream or a sequence of signals representing the computer program for performing one of the methods described herein. The data stream or the sequence of signals may for example be configured to be transferred via a data communication connection, for example via the Internet.

A further example comprises a processing means, for example a computer, or a programmable logic device, configured to or adapted to perform one of the methods described herein.

A further example comprises a computer having installed thereon the computer program for performing one of the methods described herein.

A further example comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example a field programmable gate array) may be used to perform some or all of the functionalities of the methods described herein. In some examples, a field programmable gate array may cooperate with a microprocessor in order to perform one of the methods described herein. Generally, the methods are preferably performed by any hardware apparatus.

The above described examples are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the examples herein.

Although each claim only refers back to one single claim, the disclosure also covers any conceivable combination of claims.

The invention claimed is:

1. A receiver comprising:
   a first amplifier and a second amplifier;
   a first mixer, a second mixer and a third mixer;
   a first baseband signal path and a second baseband signal path; and
   a controller configured to provide a first control signal to a control input of the first mixer, a second control signal to a control input of the second mixer and a third control signal to a control input of the third mixer;
   wherein a signal output of the first amplifier is coupled to a signal input of the first mixer and a signal input of the second mixer;
   wherein a signal output of the second amplifier is coupled to a signal input of the third mixer and not to another mixer;
   wherein a signal output of the first mixer and a signal output of the third mixer are coupled to the first baseband signal path;
   wherein a signal output of the second mixer, but not the signal output of the third mixer, is coupled to the second baseband signal path;
   wherein each mixer of the first mixer, the second mixer, and the third mixer comprises a switchable path between the mixer's signal input and the mixer's signal output;
   wherein each switchable path is switchable between a first state and a second state;
   wherein the signal input and the signal output of each mixer are electrically coupled together in the first state of the mixer's switchable path and are electrically decoupled from one another in the second state of the mixer's switchable path; and
   wherein the controller is configured to provide, in a first mode, the first, second, and third control signals such that only mixers are in a mixing mode in which they alternately switch between the first state and the second state of their switchable paths which have their signal inputs coupled to the same signal output of the same amplifier.

2. The receiver according to claim 1, wherein a mixer is configured to switch between the first state and the second state of its switchable path based on the control signal applied to the control input of the mixer.

3. The receiver according to claim 1, wherein no switchable paths are coupled between the signal outputs of the first and second amplifiers and the signal inputs of the first mixer, the second mixer, and the third mixer.

4. The receiver according to claim 1, wherein the controller is configured to provide the first and second control signals such that at a maximum the signal output of one amplifier of the first and second amplifiers is electrically coupled to each of the first baseband signal path and the second base band signal path.

5. The receiver according to claim 1, further comprising a controller configured to provide, for placing a mixer in a mixing mode, an associated control signal to a control input of the mixer, such that the control signal is an oscillator signal having a predetermined oscillator frequency and to provide, for placing a mixer in a non-mixing mode, the associated control signal to the control input of the mixer, such that the control signal is a DC signal having a predetermined potential: and
wherein in the mixing mode the mixer's switchable path alternately switches between the first state and the second state; and
wherein in the non-mixing mode the mixer's switchable path is in the second state.

6. The receiver according to claim 5,
wherein the mixer is configured to switch between the first state and the second state of its switchable path based on a potential of the control signal applied to its control input; and
wherein the predetermined potential is chosen such that for this predetermined potential, the switchable path of the mixer is in the second state.

7. The receiver according to claim 1, further comprising a controller configured to provide a first control signal to a control input of the first mixer and a second control signal to a control input of the second mixer; and
wherein the controller is configured to provide, in the first mode the first control signal having a first oscillator frequency and the second control signal having a second oscillator frequency which is different from the first oscillator frequency.

8. The receiver according to claim 1,
wherein the receiver is configured to, in the first mode, receive an RF signal having at least a first data carrier at a first carrier frequency and a second data carrier at a second carrier frequency at the first amplifier; and
wherein the controller is configured to provide a first control signal to a control input of the first mixer such that the first data carrier is mixed down to the baseband by the first mixer, and to provide a second control signal to a control input of the second mixer such that the second data carrier is mixed down to the baseband by the second mixer.

9. The receiver according to claim 8, wherein the controller is further configured to provide, in the first mode, a third control signal to a control input of the third mixer, such that the third mixer electrically decouples the second amplifier from the first baseband signal path.

10. The receiver according to claim 1, wherein the receiver is configured to concurrently receive, in a second mode, a first RF signal having a first data carrier at a first carrier frequency at a signal input of the first amplifier, and a second RF signal having a second data carrier at a second carrier frequency at a signal input of the second amplifier.

11. The receiver according to claim 10, further comprising a controller configured to provide to each mixer of the first mixer, the second mixer and the third mixer an associated control signal, wherein the controller is configured to provide, in the second mode, the control signals such that the first data carrier is mixed down to the baseband by the second mixer and the second data carrier is mixed down to the baseband by the third mixer and furthermore, such that the first amplifier is electrically decoupled from the first baseband signal path by the first mixer.

12. The receiver according to claim 1, wherein at least one mixer of the first mixer, the second mixer, and the third mixer comprises a transistor, a first terminal of which is directly connected to the signal input of the at least one mixer, a second terminal of which is directly connected to the signal output of the at least one mixer and a control terminal of which is coupled to a control input of the at least one mixer.

13. The receiver according to claim 1, further comprising a fourth mixer, a signal input of which is coupled to the signal output of the second amplifier and a signal output of which is coupled to the second baseband signal path.

14. A receiver comprising:
a first amplifier and a second amplifier;
a first mixer, a second mixer and a third mixer;
a first baseband signal path and a second baseband signal path; and
a controller configured to provide a first control signal to a control input of the first mixer, a second control signal to a control input of the second mixer and a third control signal to a control input of the third mixer;
wherein a signal output of the first amplifier is coupled to a signal input of the first mixer and a signal input of the second mixer;
wherein a signal output of the second amplifier is coupled to a signal input of the third mixer and not to another mixer;
wherein a signal output of the first mixer and a signal output of the third mixer are coupled to the first baseband signal path;
wherein a signal output of the second mixer, but not the signal output of the third mixer, is coupled to the second baseband signal path;
wherein each mixer of the first mixer, the second mixer, and the third mixer comprises a switchable path between the mixer's signal input and the mixer's signal output;
wherein each switchable path is switchable between a first state and a second state;
wherein the signal input and the signal output of each mixer are electrically coupled together in the first state of the mixer's switchable path and are electrically decoupled from one another in the second state of the mixer's switchable path; and
wherein the controller is configured to provide, in a second mode, the first, second and third control signals such that at a maximum one mixer of the first mixer and the second mixer is in a mixing mode in which the one mixer alternately switches between the first state and the second state of the one mixer's switchable paths, while the other mixer of the first mixer and the second mixer is in a non-mixing mode in which the other mixer's switchable path is in the second state.

15. A receiver comprising:
- a first amplifier and a second amplifier;
- a first mixer, a second mixer and a third mixer; and
- a first baseband signal path and a second baseband signal path;
- wherein a signal output of the first amplifier is coupled to a signal input of the first mixer and a signal input of the second mixer;
- wherein a signal output of the second amplifier is coupled to a signal input of the third mixer;
- wherein a signal output of the first mixer and a signal output of the third mixer are coupled to the first baseband signal path; and
- wherein a signal output of the second mixer is coupled to the second baseband signal path;
- a first additional mixer, a signal input of which is coupled to the signal output of the first amplifier and a signal output of which is coupled to the first baseband signal path.

16. The receiver according to claim 15, further comprising a controller configured to provide a first control signal to a control input of the first mixer and an additional control signal to a control input of the first additional mixer, wherein the controller is configured to provide, in a second mode, the first control signal and the first additional control signal such that they are equal and a data carrier in an RF signal received at the first amplifier is mixed down to the baseband concurrently by the first mixer and the first additional mixer.

17. Receiver according to claim 16, wherein the controller is further configured to provide, in a first mode, the first control signal and the first additional control signal such that a data carrier in a further received RF at the first amplifier signal is mixed down to the baseband either by the first mixer or the first additional mixer.

18. A receiver comprising:
- a first low noise amplifier (LNA) and a second LNA;
- a first mixer, a second mixer and a third mixer;
- a first baseband signal path and a second baseband signal path; and
- a controller configured to provide a first control signal to a control input of the first mixer, a second control signal to a control input of the second mixer and a third control signal to a control input of the third mixer;
- wherein a signal output of the first LNA is coupled to a signal input of the first mixer and a signal input of the second mixer;
- wherein a signal output of the second LNA is coupled to a signal input of the third mixer;
- wherein a signal output of the first mixer and a signal output of the third mixer are coupled to the first baseband signal path; and
- wherein a signal output of the second mixer is coupled to the second baseband signal path;
- wherein each mixer of the first mixer, the second mixer and the third mixer comprises a switchable path between the respective mixer's signal input and the mixer's signal output;
- wherein each switchable path is switchable between a first state and a second state;
- wherein the signal input and the signal output of each mixer of the first mixer, the second mixer and the third mixer are electrically coupled together in the first state of the mixer's switchable path and are electrically decoupled from one another in the second state of the mixer's switchable path;
- wherein the receiver is configured to receive, in a first mode, a first RF signal having at least a first data carrier at a first carrier frequency and a second data carrier at a second carrier frequency at the first LNA;
- wherein the controller is configured to provide, in the first mode, the first control signal to the first mixer, such that the first mixer is in a mixing mode in which the first mixer alternately electrically couples and decouples the first LNA and the first baseband signal path for mixing the first data carrier down to the baseband, the second control signal to the second mixer, such that the second mixer is in a mixing mode in which the second mixer alternately electrically couples and decouples the first LNA and the second baseband signal path for mixing the second data carrier down to the baseband and the third control signal to the third mixer, such that the third mixer is in a non-mixing mode in which the third mixer electrically decouples the second LNA from the first baseband signal path;
- wherein the receiver is configured to receive, in a second mode, a second RF signal comprising a third data carrier at the first LNA and a third RF signal comprising a fourth data carrier at the second LNA; and
- wherein the controller is configured to provide, in the second mode, the first control signal to the first mixer such that the first mixer is in a non-mixing mode in which the first mixer electrically decouples the first LNA and the first baseband signal path, the second control signal to the second mixer, such that the second mixer is in the mixing mode for mixing the third data carrier down to the baseband and the third control signal to the third mixer, such that the third mixer is in a mixing mode in which the third mixer alternately electrically couples and decouples the second LNA and the first baseband signal path for mixing the fourth data carrier down to the baseband.

* * * * *